UNITED STATES PATENT OFFICE.

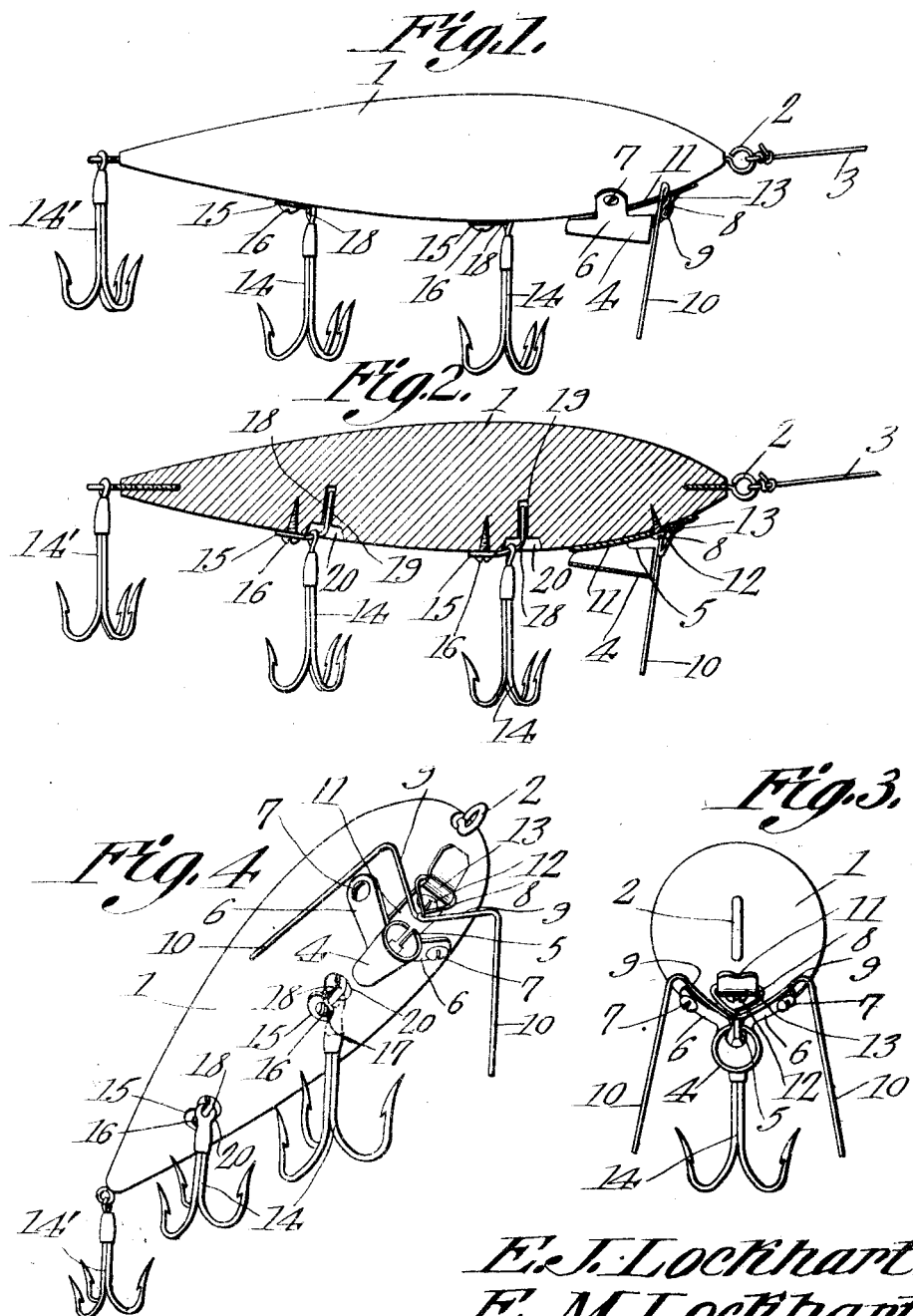

EDWARD J. LOCKHART AND EVELYN M. LOCKHART, OF GALESBURG, MICHIGAN.

ARTIFICIAL BAIT.

1,113,360.

Specification of Letters Patent.

Patented Oct. 13, 1914.

Application filed August 4, 1913. Serial No. 782,972.

*To all whom it may concern:*

Be it known that we, EDWARD J. LOCKHART and EVELYN M. LOCKHART, citizens of the United States, residing at Galesburg, in the county of Kalamazoo, State of Michigan, have invented a new and useful Artificial Bait, of which the following is a specification.

The present invention appertains generally to artificial fishing baits or lures, and relates more particularly to an improvement over the devices disclosed in Patents Nos. 923,670 and 1,009,077, issued June 1, 1909 and November 21, 1911, respectively.

It is the object of the present invention to provide a novel and simple attachment for a buoyant or flotative bait body, which will cause the body to dive into the water when drawn or jerked forwardly by the fishing line, and which will cause the body to move under the surface of the water as the fishing line is drawn or reeled in.

The present invention also contemplates the production of a device of the nature indicated which will tend to impart a lateral or side-wise movement to the bait body, in order that the body, when drawn through the water, will simulate the movements of a minnow or live bait, to most effectively attract or lure the larger fish.

With the foregoing general objects outlined and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a side elevation of the improved bait or lure. Fig. 2 is a longitudinal section thereof. Fig. 3 is a front end view of the device, on a slightly enlarged scale. Fig. 4 is a perspective view of the device.

In carrying out the invention, reference being had in detail to the drawing, there is provided a body 1, turned or fashioned from wood, or other buoyant or flotative material, and preferably ovoid or fusiform in contour, although it is to be understood that the body may be of various proportions, and forms. The forward end of the body 1, is provided with an eye screw or other attaching means 2 for the attachment of the line 3, whereby the bait may be drawn forwardly by means of a fishing pole, or a reel, whichever is desired.

The improved attachment for causing the body to dive and move under the surface of the water, comprises a tube 4, preferably fashioned from a blank of sheet metal or other suitable stock separate from and considerably smaller than the body 1. The tube 4 is tapered, and is disposed below the bottom of the body 1, adjoining the forward end of the body, the axis of the tube 4 being inclined rearwardly so as to intersect the axis of the body 1 at a point adjoining the rear end of the body. The larger end of the tube 4 is disposed forwardly, while the smaller end is disposed rearwardly and relatively close to the bottom of the body 1, the tube 4 being split longitudinally from end to end at its top, as at 5, and the edges of the split 5 being provided with diverging curved ears 6 intermediate the ends of the tube 4. The ears 6 rest snugly against the bottom of the body 1, and are secured to the body by means of screws or other securing members 7, whereby the tube 4 is firmly carried by the bottom of the body.

The improved weed guard is preferably fashioned from a length of resilient or flexible wire of suitable gage and quality, the intermediate portion of the wire or strand being twisted into an eyelet or loop 8, while the adjoining portions of the two sections of the wire are bent back over the side portions of the eyelet or loop 8 to form diverging arms 9. The terminal portions of the wire or strand are bent angularly from the arms 9 to provide the antennæ or feeler-like members 10 which diverge downwardly from the free ends of the arms 9. The arms 9 are preferably bent or curved to conform to the curvature of the forward end portion of the body 1, and the intermediate portion or bend of the eyelet or loop 8 is preferably straight.

The weed guard is detachably carried by the body 1, in advance of the tube 4 by means of a flexible or resilient tongue or leaf spring 11 formed from a strip of metal. The tongue 11 is disposed snugly against the bottom of the body 1 adjoining the forward end of the body, the rear end of the tongue 11 being clamped between the body, and the tube 4, and the tongue 11 being secured firmly to the body 1, by means of a screw or other securing member 12 engaged through an aperture provided in the tongue 11 and taking into the body 1. The tongue 11 projects in advance of the tube 4, the screw 12 being disposed adjoining the forward end or mouth of the tube 4, the tongue 11 is provided adjoining its forward end or directly in advance of the screw 12, with a crimp or outstruck portion 13 receiving the straight portion of the eyelet or loop 8. The screw 12 in being tightened will clamp the forward end of the tongue 11 against the body, to maintain the weed guard in position, it being observed that the weed guard is free to swing or oscillate to a limited extent. When the weed guard or antennæ thereof, are swung rearwardly, the arms 9 are adapted to swing toward the body 1 to limit the rearward movement of the antennæ 10. In this manner, when the antennæ 10 are swung to their rearmost position, they will be slightly inclined, as seen in Figs. 1 and 2.

The body 1 is adapted to carry one or more hooks for snagging or catching the fish which attempt to bite or swallow the bait. As illustrated, a pair of hooks 14 are carried by the bottom of the body 1 in rear of the tube 4, and the trailer hook 14' is carried by the rear end or tail of the body 1. The hooks 14 are attached to the body 1 in a peculiar or unique manner, as will be presently described.

Washers 15 are clamped against the bottom of the body 1 at longitudinally spaced points, by means of screws or other securing members 16, the washers 15 each being provided with an eye 17, as illustrated in Fig. 4, to engage the respective screw 16 adjacent the head thereof. The washers 15 are preferably stamped from sheet metal and are provided with the angular tails or extensions 18, the free ends of which engage in sockets 19 drilled or provided in the bottom of the body 1. The mouths of the sockets 19 are preferably countersunk or enlarged, as at 20. The eyes of the hooks 14 loosely engage the basal portions of the tails or extensions 18, and work within the countersunk portions 20 in order that the hooks may swing or oscillate loosely in various directions.

In use, the improved bait is cast in the usual manner, and ordinarily when the line is slackened, the body 1 will float. When the body 1 is drawn forwardly through the medium of the line 3, by swinging or jerking the pole, or by reeling in the line, the water in passing diagonally upward through the tube 4, will cause the body to dive or submerge quickly and readily into the water, and as the line is drawn forwardly, the body will move under the surface of the water, due to the continual flow of the water through the tube 4, as will be apparent. The inclination of the tube 4 will give a downward thrust to the body as the body is drawn through the water, while the taper of the tube will create a resistance to the passage of the water through the tube, which will increase the efficiency of the present device, as well as tending to move the body sidewise or laterally. This latter action is increased, by the action of the water passing through the tube 4 impinging against the bottom of the body and being deflected laterally to the respective sides.

It is evident that the tube 4 and its ears 6 may be readily stamped from a blank of sheet metal, the intermediate portion of the blank being crimped or doubled to form the tube or corrugation 4 providing a water passage independent of the body. The present attachment is applicable to the body in an easy and simple manner, to accomplish the results desired, and without drilling holes or cutting slots in the body. The body 1 may be finished in any desirable manner to increase the attractiveness thereof for luring the larger fish and the polish or finish of the body is not in any manner encumbered by the attachment above described.

The weed guard is of advantage when the bait or lure is employed in lily ponds or in other waters containing weeds or other vegetation, it being observed, of course, that when the bait is employed in open waters, the weed guard may be detached. The antennæ tend to deflect the weeds and other extraneous objects out of the path of the hooks, and the tube 4, whereby the efficiency of the bait will be maintained, although the bait is employed in weedy waters or the like. To detach the weed guard, it is merely necessary to loosen the screw 12, in which event, the eyelet or loop 8 may be slipped out of engagement with the forward end of the tongue 11. The hooks 14 are also readily detached from the body, for the purpose of replacement, or the like, it merely being necessary to loosen the screws 16, which will permit the washers 15 to be loosened in order that the tails or extensions 18 may be withdrawn from the sockets 19. After the washers have been loosened, the hooks may be slipped off of the tails or extensions 18, and may be replaced by other hooks, it being understood that the hooks may be of the single, double, treble or any other type. To attach the hooks to the body, the tails 18 are engaged in the sockets 19 of the body, and the washers 15 are clamped against the body 1 by the screws 16, to maintain the extensions 18 in position.

Particular attention is directed to the fact that the diving attachment is relatively small and non-encumbering, which is highly essential, and that the said attachment is applied to the forward end portion of the body, so as to further render the attachment non-encumbering. The attachment will not interfere with the hooks which are attached to the body, and furthermore, the tube or passage being disposed at the forward end of the body will cause the body to dive or descend into the water, in a practically horizontal position. The tube or passage being disposed at the forward end of the body, and at the bottom of the body, and being tapered, will cause the body to dive in the manner indicated, which will tend to impart a transverse movement to the body, to simulate the movement of a minnow or live bait.

Having thus described the invention, what is claimed as new is:—

1. In an artificial bait, a buoyant hook-carrying body, and a member separable from and attached to the body, the member being considerably smaller than the body and having an inclined water passage independent thereof.

2. In an artificial bait, a buoyant hook-carrying body, and a member formed from a blank separable from and having its terminals attached to the body, the member being considerably smaller than the body and having its intermediate portion bent to provide a corrugation, the corrugation being inclined and forming a water passage independent of the body.

3. In an artificial bait, a buoyant hook-carrying body, and an inclined tube considerably smaller than the body and attached thereto.

4. In an artificial bait, a buoyant hook-carrying body, and a relatively small inclined longitudinally split tube, having ears projecting from its edges and resting against and secured to the body.

5. In an artificial bait, a buoyant hook-carrying body, and a rearwardly inclined and tapered tube disposed below the body, the tube being split longitudinally at its top and having ears projecting from its edges and secured to the body.

6. In an artificial bait, a buoyant hook-carrying body, an inclined tube having oppositely projecting ears resting against the body, and means for securing the ears to the body.

7. In an artificial bait, a buoyant hook-carrying body, a rearwardly inclined and tapered tube disposed below the body and having oppositely projecting ears resting thereagainst, and means for securing the ears to the body.

8. In an artificial bait, a buoyant hook-carrying body, and a tube considerably smaller than the body attached to the forward end portion thereof, the tube being inclined and tapered rearwardly.

9. In an artificial bait, a buoyant hook-carrying body, and a rearwardly and inclined tapered tube carried by the bottom of the body at the forward end portion thereof.

10. In an artificial bait, a buoyant hook-carrying body, and a member formed from a blank separable from and terminally attached to the body, the said member being considerably smaller than the body and having its intermediate portion provided with a tube, and the tube being inclined.

11. In an artificial bait, a buoyant hook-carrying body, and a member formed from a blank separable from and terminally attached to the bottom of the body, the said member being considerably smaller than the body and having its intermediate portion bent to provide a tube, and the tube being inclined.

12. In an artificial bait, a buoyant hook-carrying body, and a member formed from a blank separable from and terminally attached to the bottom of the body at the forward end thereof, said member being considerably smaller than the body and having its intermediate portion provided with a tube, the tube being inclined and tapered rearwardly.

In testimony that we claim the foregoing as our own, we have hereto affixed our signatures in the presence of two witnesses.

EDWARD J. LOCKHART.
EVELYN M. LOCKHART.

Witnesses:
 SIDNEY DUNN,
 CARL CLAPP.